Patented Nov. 1, 1949

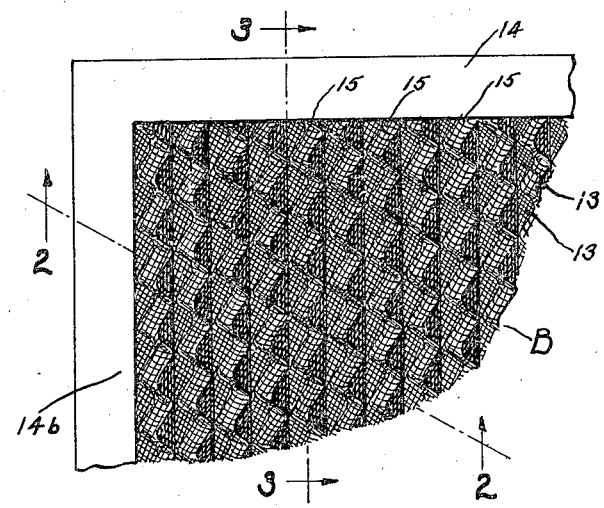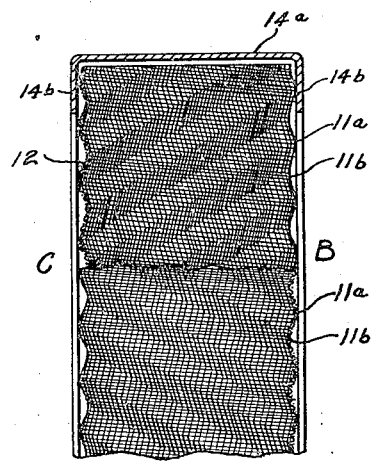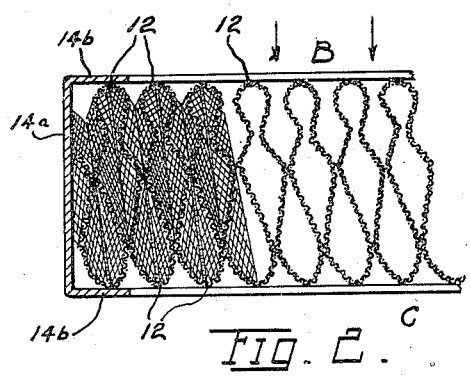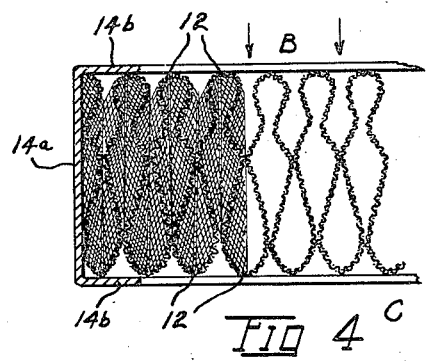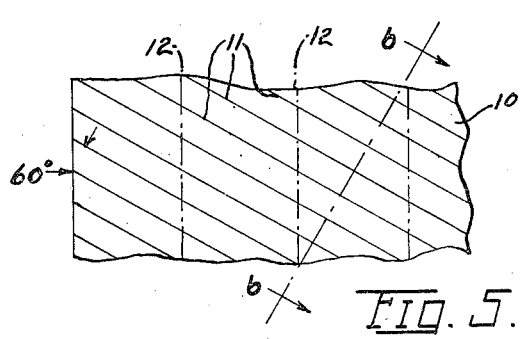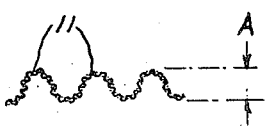

2,486,728

UNITED STATES PATENT OFFICE 2,486,728

FILTER PANEL

Samuel C. Asad, Cleveland, Ohio, assignor to Air-Maze Corporation, Cleveland, Ohio, a corporation of Delaware Application June 22, 1945, Serial No. 600,987

2 Claims. (Cl. 183—71)

1

This invention relates to an improvement in filter panels particularly of the type adapted to remove dirt particles from a gaseous stream of air and an improved method of making the panel.

An object of the present invention is to provide a filter of cheap screen material by means of cheap machine operations, the net result of which is an efficient filter having low resistance to the passage of a gaseous stream and a high dirt-holding capacity.

Another object of the present invention is to provide an improved method of forming a filter panel of the type described.

Other objects and advantages of the present invention will be apparent from the accompanying drawings and description, and the essential features thereof will be summarized in the claims.

In the drawings:

Fig. 1 shows a fragmental elevational view of a face of a filter panel constructed according to my invention;

Fig. 2 is a sectional view of the same taken along the line 2—2 of Fig. 1;

Fig. 3 is a transverse sectional view taken along the line 3—3 of Fig. 1;

Fig. 4 is a view similar to Fig. 2 showing a modified manner of folding the filter material into a frame;

Fig. 5 is a plan view on a small scale of a sheet of mesh material out of which a filter is formed with crimp lines shown in full and fold lines shown in dot-dash lines; while Fig. 6 is an enlarged sectional view taken along the line 6—6 of Fig. 5.

I have chosen to describe my invention as constructed from a sheet of flat screen mesh of a standard variety woven uniformly with a set of warp wires extending at right angles to a set of shoot wires the same forming a screen of regular weave of well known type. It should be understood, however, that any regularly woven mesh material may be formed as herein described to provide a filter panel according to my teachings. No mention need be made of the specific filaments of the screen mesh material as they may be of metal, plastic, or other suitable stiff material, and they may be bare, cloth-covered, flock-coated, or otherwise treated as required for specific applications. My invention applies equally well regardless of the specific surface of the mesh material.

The sheet 10 of Fig. 5 has been formed from a flat sheet by running the same through a set of crimping rolls to form a series of crimps 11 extending at an angle to the sides of the rectangular sheet as clearly shown in Fig. 5. In this particular view, the crimps form an angle of approximately sixty degrees with the left-hand edge of the sheet as viewed in Fig. 5, although it will be understood that this angle may be varied as desired. The height of the crimps 11 may be of any desired dimension A depending on the purpose for which the filter panel is used. Standard constructions having a dimension A from $\frac{3}{32}$ inch to $\frac{3}{4}$ inch would meet a wide variety of air-filtering demands.

The next operation after crimping is a folding or pleating of the sheet 10 along the lines 12 indicated in dot-dash lines on Fig. 5. Preferably, this folding is done by running the sheet 10 through a pleating machine, the folding blades of which are parallel to the lines 12, but obviously, might be done by hand if desired. The pleating machine does the job quickly and cheaply and more accurately than can be done by hand. The folding is done alternately in opposite directions on the lines 12 as best seen in Fig. 2 which shows a section of the sheet 10 after it has been folded. This gives a generally zig-zag form to the sheet 10 after which the zig-zag folds are pressed close together and inserted in a holding frame as will be presently described. Generally triangular spaces are left between adjacent folds to permit the easy entrance of air as is indicated by the spaces 13 of Fig. 1.

As illustrated in Fig. 3, it results from the zig-zag folding of the sheet 10 along the lines 12 that the alternate ridges and troughs 11a and 11b, respectively, cross each other in adjacent layers. As viewed in the upper portion of Fig. 3, these corrugations extend from the face C toward the face B upwardly and toward the left. As viewed in the lower portion of Fig. 3, these corrugations extend from the face C toward the face B upwardly and toward the right. Obviously, then, when the zig-zag folds are pressed close together, the contiguous corrugations in adjacent layers cross each other and touch each other only at the ridges of crimps 11.

Referring now to Figs. 1 and 2, the folded element described is placed in a suitable frame 14. The frame here shown is channel shape in section having uninterrupted webs 14a inclosing the sides of the panel and flanges 14b overlying the front and rear faces B and C of the panel at the edges only. It results from this construction that the gaseous stream flowing through a duct or the like parallel to the web 14a is compelled to pass through the panel in the direction of the arrows of Fig. 2 and generally parallel to the planes in which the crimps 11 lie. Referring specifically to Fig. 3, successive layers of the zig-zag folds have been illustrated to show how the corrugations cross each other in adjacent folds. Remembering how the folding occurred as illustrated in Fig. 5, it will be seen in the upper part of Fig. 3 that the screen has been cut along a fold line 12 at the face C, and in the lower part of Fig. 3, the cut is along the next fold line 12 at the face B.

It should now be clear that the flow of air through the panel from the face B to the face C will enter wholly unopposed through the generally triangular openings 13 and pass between the parallel crossing crimps or corrugations 11 until the stream comes to the face C of the panel at which time it will pass through a single layer of screen material which connects adjacent folds. Referring again to Fig. 1, the air will also enter along the edges 15 where there is but a single layer of screen material where it was folded along the lines 12 as previously described. It will be noted that the screen is distorted at the points 15 so that instead of there being well-defined straight lines along the fold lines 12, they become zig-zag because of the distortion caused by crimps 11. After passing through this single layer, the stream is again in a series of crossing crimps 11 and passes unopposed to the face C of the filter passing out other openings corresponding to the openings 13.

It should be noted that where a gaseous stream is passing between adjacent folds having the corrugations crossing each other, as previously described, the air passing at one angle, say down the crimps shown in the upper part of Fig. 3, will flow across the streams of air tending to travel along the crimps of the lower part of Fig. 3 (it being understood that in the panel of Figs. 1 and 2 the crimps of Fig. 3 actually touch each other at their crossing points). This results in a turbulence of the streams where the currents cross, and this aids in the depositing of entrained particles upon the filter element.

It will be understood by those trained in this art that where bare screen filaments are used, they are quite often coated with a viscous material so that they will better hold the particles of dirt or other material carried in the gaseous stream. Where the screen filaments are covered with cloth, flocking, or the like, they may be used either dry or with a viscous coating.

While the above description is made as if the flow of air or other gaseous stream were generally parallel to the planes of the zig-zag folds, there is a certain advantage in tilting the folds slightly as seen in Fig. 2. It increases the efficiency of the filter somewhat. It will be noted that the left hand fold of Fig. 2 against the frame side 14a is so formed that the edge of the fold nearer filter face B is cut away and flattened so that the other edge, near face C, is thicker and, since the folds are touching all across the filter face, it results that all of the zig-zag folds are tilted at a slight angle to the arrows indicating general stream flow in Fig. 2.

In the modification of Fig. 4, everything is exactly like the panel first described except that the left hand fold of screen material next to the frame web 14a is of full thickness clear up to the face B, resulting in the folds of filter material extending generally at right angles to the faces B and C, instead of at the slight angle of Fig. 2. This form of my invention is almost as efficient as the form discussed in connection with Fig. 2.

What I claim is:

1. A filter panel for a gaseous stream comprising a sheet of stiff mesh material crimped with a series of parallel corrugations of relatively lesser height and then folded alternately back and forth toward the front and rear of said panel along parallel lines at an angle to said corrugations to provide a series of zig-zag folds of relatively greater height, the layers of said folds lying generally in substantially parallel planes with the high points of corrugations of adjacent folds substantially touching, and frame means compelling flow of a gaseous stream generally parallel to said layers, whereby relatively smooth folded edges of the mesh material are presented at the front and rear of said panel.

2. A filter for a gaseous stream comprising a sheet of stiff mesh material crimped with a series of parallel corrugations of relatively lesser height and then folded along parallel lines at an angle to said corrugations to provide a series of zig-zag folds of relatively greater height, the layers of said folds lying generally in substantially parallel planes with the high points of corrugations of adjacent folds substantially touching, flat frame means compelling flow of a gaseous stream in a path generally at right angles to said folds, a fold near one end of said series of folds being formed to hold said folds at an angle to said path, whereby straight line flow of said stream will tend to pass through a plurality of layers of said folds in passing through the filter.

SAMUEL C. ASAD.

REFERENCES CITED

The following references are of record in the file of this patent:

UNITED STATES PATENTS

| Number | Name | Date |
| --- | --- | --- |
| 2,016,992 | Dollinger | Oct. 8, 1935 |
| 2,190,886 | Schaaf et al. | Feb. 20, 1940 |
| 2,274,684 | Goodloe | Mar. 3, 1942 |
| 2,286,479 | Farr | June 16, 1942 |
| 2,327,184 | Goodloe | Aug. 17, 1943 |